United States Patent
Köhnke et al.

(10) Patent No.: US 10,425,487 B2
(45) Date of Patent: Sep. 24, 2019

(54) METHOD FOR MANAGING A FIRST COMMUNICATION LINK, SYSTEM COMPRISING A FIRST COMMUNICATION PARTNER AND A SECOND COMMUNICATION PARTNER, AND A VEHICLE

(71) Applicant: VOLKSWAGEN AG, Wolfsburg (DE)

(72) Inventors: Axel Köhnke, Dülmen (DE); Sascha Jurthe, Hattingen (DE); Dirk Frijters, Witten (DE)

(73) Assignee: Volkswagen AG (DE)

( * ) Notice: Subject to any disclaimer, the term of this patent is extended or adjusted under 35 U.S.C. 154(b) by 178 days.

(21) Appl. No.: 15/716,054

(22) Filed: Sep. 26, 2017

(65) Prior Publication Data
US 2018/0124179 A1     May 3, 2018

(30) Foreign Application Priority Data
Oct. 27, 2016   (DE) .................. 10 2016 221 233

(51) Int. Cl.
*H04L 29/08*     (2006.01)
*H04L 29/06*     (2006.01)
(Continued)

(52) U.S. Cl.
CPC ............ *H04L 67/12* (2013.01); *H04L 9/3271* (2013.01); *H04L 63/126* (2013.01);
(Continued)

(58) Field of Classification Search
CPC ....... H04L 67/12; H04L 67/14; H04L 67/142; H04L 67/143
See application file for complete search history.

(56) References Cited

U.S. PATENT DOCUMENTS

2006/0271697 A1 * 11/2006 Kruse .............. H04L 29/08072
709/230
2014/0215491 A1   7/2014 Addepalli et al.
(Continued)

FOREIGN PATENT DOCUMENTS

DE   102014224694 A1   6/2015
DE   102014214300 A1   1/2016
(Continued)

OTHER PUBLICATIONS

Office Action for Korean Patent Application No. 10-2017-0137178; dated Mar. 15, 2018.

*Primary Examiner* — Ponnoreay Pich
(74) *Attorney, Agent, or Firm* — Barnes & Thornburg LLP

(57) ABSTRACT

A method for managing a first communication connection between a first communication partner and a second communication partner. The method entails receiving a first message by the first communication partner, wherein the first message contains a command to disconnect the first communication connection. The method further entails transmitting a second message by the first communication partner to the second communication partner via a different second communication connection between the first communication partner and the second communication partner, wherein the second message contains a request to confirm the validity of the command. The method also entails disconnecting the first communication connection by the first communication partner if the first communication partner receives a third message via the second communication connection, wherein the third message contains a confirmation of the validity of the command.

17 Claims, 4 Drawing Sheets

(51) Int. Cl.
    *H04L 9/32*          (2006.01)
    *H04W 12/12*       (2009.01)
    *H04L 29/14*        (2006.01)
    *H04W 4/44*        (2018.01)
    *H04W 12/06*       (2009.01)

(52) U.S. Cl.
    CPC ............ *H04L 67/143* (2013.01); *H04L 69/40* (2013.01); *H04W 4/44* (2018.02); *H04W 12/12* (2013.01); *H04L 2209/84* (2013.01); *H04W 12/06* (2013.01)

(56) References Cited

U.S. PATENT DOCUMENTS

2014/0351880 A1* 11/2014 Low ................... H04L 63/20
                                                                               726/1
2015/0373121 A1* 12/2015 Secilmis ............. H04L 67/12
                                                                               455/41.2
2018/0131408 A1*  5/2018 Austad ................ H04W 76/14
2018/0295510 A1* 10/2018 Vikberg ............. H04L 63/0892

FOREIGN PATENT DOCUMENTS

| DE | 102014220535 A1 | 4/2016 |
| JP | 2006524935 A | 11/2006 |
| KR | 20110076575 A | 7/2011 |

\* cited by examiner

METHOD FOR MANAGING A FIRST COMMUNICATION LINK, SYSTEM COMPRISING A FIRST COMMUNICATION PARTNER AND A SECOND COMMUNICATION PARTNER, AND A VEHICLE

PRIORITY CLAIM

This patent application claims priority to German Patent Application No. 10 2016 221 233.8, filed 27 Oct. 2016, the disclosure of which is incorporated herein by reference in its entirety.

SUMMARY

Illustrative embodiments relate to communication between two communication partners. Illustrative embodiments relate to a method for managing a first communication connection, a system comprising a first communication partner and a second communication partner, and a vehicle.

BRIEF DESCRIPTION OF THE DRAWINGS

Example embodiments are explained in detail below with reference to the attached figures. In the figures.

DETAILED DESCRIPTION

A communication connection (e.g., wireless or wired) between two devices can be interrupted by attackers. For example, a wireless communication connection via a Wireless Local Area Network (WLAN) between two devices can be interrupted by an attacker by a deauthentication request which is simple to falsify. A device is prompted by an external attacker to clear down an existing connection. This results in an interruption of the WLAN communication between two devices. As a result, for example, functionalities which use this WLAN connection, cannot be provided.

Figure 1:
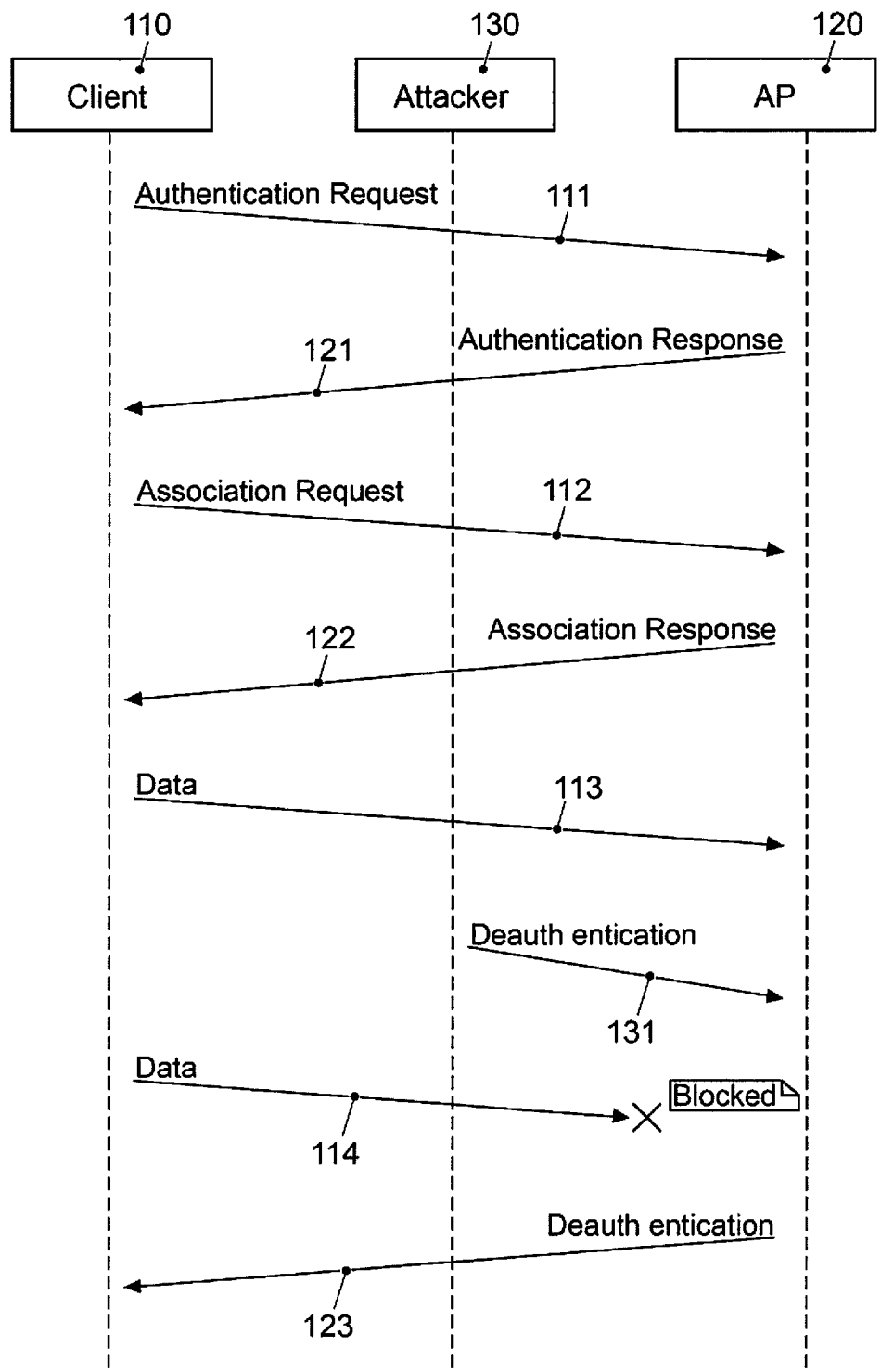
FIG. 1 shows a schematic sequence of an example of a deauthentication attack.

A schematic sequence of an example of a deauthentication attack in the case of a WLAN connection is shown by way of illustration in FIG. 1.

A client 110 transmits, for example, an authentication request 111 to a network access point 120. The network access point (AP) 120 in turn transmits an authentication response 121 to the client 110. The client 110 then transmits an association request 112 to the network access point 120. The network access point 120 in turn transmits an association response 122 to the client 110. The WLAN connection between the client 110 and the network access point 120 is, therefore, set up and data 113 can be exchanged between the client 110 and the network access point 120.

A falsified deauthentication request 131 can now be sent by an attacker 130 to the network access point 120. The transmission of further data 114 between the client 110 and the network access point 120 is thereby stopped or impossible. The network access point 120 still confirms the deauthentication 123 to the client.

A WLAN connection can, thus, be permanently interrupted by a deauthentication attack. This attack may also be a preparation for further attacks.

A requirement, therefore, exists to provide a facility for improving the resilience of a communication connection to third-party attacks.

The present disclosure enables this through a method for managing a first communication connection between a first communication partner and a second communication partner. The first communication partner and the second communication partner may be any devices which can exchange data or information with one another via a communication connection. The first communication partner and the second communication partner may, for example, be a mobile terminal device, a control unit, a computer or a network access point. The communication connection may be any communication connection which enables a communication between two communication partners. The first communication connection may, therefore, be designed as either wireless (e.g., WLAN according to the IEEE 802.11 standard of the Institute of Electrical and Electronics Engineers, IEEE; BLUETOOTH® according to the IEEE 802.15.1 standard of the IEEE; Near Field Communication, NFC, according to one of the ISO 14443, 18092 or 21481 standards of the International Organization for Standardization, ECMA 340, 352, 356, 362 of the European Computer Manufacturers Association or ETSI TS 102 190 of the European Telecommunications Standards Institute) or wired (e.g., a Local Area Network, LAN; Ethernet; bus).

The method comprises a reception of a first message by the first communication partner. The first message contains a command to disconnect the first communication connection. The first message may originate from either the second communication partner wishing to disconnect the first communication connection to the first communication partner, or from an attacker wishing to interrupt the communication connection between the first communication partner and the second communication partner. To do this, the attacker may, for example, steal an identity or identifier of the second communication partner and manipulate the first message in such a way that it identifies the second communication partner as the sender of the message.

The method, therefore, further entails a transmission of a second message by the first communication partner to the second communication partner via a different second communication connection between the first communication partner in the second communication partner. The second message contains a request to confirm the validity of the command. The first communication partner and the second communication partner can, therefore, exchange messages via two communication connections, i.e., via two different communication channels. As with the first communication connection, the second communication connection may be any communication which enables a communication between two communication partners and is different from the first communication connection. By the second message, the first communication partner can verify whether the first message with the disconnection command also actually originates from the second communication partner.

The method furthermore entails a disconnection of the first communication connection by the first communication partner (only) if the first communication partner receives a third message via the second communication connection, the third message containing a confirmation of the validity of the command. The disconnection is, therefore, carried out (only) following a confirmation by the second communication partner that the communication connection is really intended to be disconnected. An erroneous disconnection of the communication connection as a result of an attack by a third party (i.e., a transmission of the first message by the third party) can, thus, be avoided. The resilience of the first communication connection to third-party attacks can, thus, be improved.

According to some example embodiments, the method furthermore comprises a maintenance of the first communication connection by the first communication partner if the first communication partner receives a fourth message via the second communication connection, the fourth message containing a negation of the validity of the command. If the first message does not originate from the second communication partner, the first communication connection is, therefore, maintained. An erroneous disconnection of the communication connection as a result of an attack by a third party (i.e., a transmission of the first message by the third party) can, thus, be avoided. The resilience of the first communication connection to third-party attacks can, thus, be improved.

In some example embodiments, following the reception of the second message, the method further comprises a check by the second communication partner to determine whether the command was transmitted by the second communication partner. The second communication partner, following a request from the first communication partner, therefore, actively checks whether the first message along with the disconnection command was actually transmitted by it. If the command was transmitted by the second communication partner, the method, therefore, furthermore comprises a transmission of the third message to the first communication partner via the second communication connection. If the command was not transmitted by the second communication partner, the method alternatively comprises a transmission of the fourth message to the first communication partner via the second communication connection. Through the active verification by the second communication partner when requested, information relating to the verification of the validity of the first message can be provided to the first communication partner. The transmission of the third or fourth message via the second communication connection can furthermore increase security against manipulations by third parties, since the third party must also be aware of the second communication connection as well as the first communication connection, and would have to manipulate or influence both communication connections more or less simultaneously.

According to some example embodiments, the method furthermore comprises a logging of the first message if the command was not transmitted by the second communication partner. Attempted attacks on the first communication connection can be recorded by the logging, for example, to subsequently analyze them and take countermeasures. Alternatively or additionally, a manager of the first communication partner, the second communication partner and/or the first communication connection can also be notified of the first message if the command was not transmitted by the second communication partner. In this way, the manager can be informed in real time of a possible attack, for example, to be able to respond to it.

In some example embodiments, the first communication connection is a wireless connection between the first communication partner and the second communication partner. The first communication connection is, for example, the connection normally used for data exchange between the communication partners. The design of the first communication connection as a wireless connection can simplify a data exchange between the communication partners, since, for example, no cable connection with a high data rate needs to be installed or provided between the two communication partners.

According to some example embodiments, the second communication connection is a wired connection between the first communication partner and the second communication partner. Since only the messages or data for checking the validity of the disconnection command are transmitted via the second communication connection in the disclosed method, an already existing wire connection, for example, between the two communication partners with a low data rate can be used. A wired connection can furthermore increase security against third-party attacks, since physical access to the cable, wire or line is necessary.

According to a further disclosed embodiment, the resilience of a communication connection to third-party attacks is improved by a system comprising a first communication partner and a second communication partner. The first communication partner and the second communication partner communicate with one another via a first communication connection.

The first communication partner is configured to receive a first message, wherein the first message contains a command to disconnect the first communication connection. As already explained above, the first message may originate from either the second communication partner wishing to disconnect the first communication connection to the first communication partner, or from an attacker wishing to interrupt the communication connection between the first communication partner and the second communication partner.

The first communication partner is, therefore, furthermore configured to transmit a second message to the second communication partner via a different second communication connection between the first communication partner and the second communication partner. The second message contains a request to confirm the validity of the command. The first communication partner and the second communication partner are, therefore, interconnected via two communication connections, i.e., they can exchange messages or information via two different communication channels. By the second message, the first communication partner can verify whether the first message with the disconnection command actually originates from the second communication partner.

The first communication partner is also configured to disconnect the first communication connection (only) if the first communication partner receives a third message via the second communication connection, the third message containing a confirmation of the validity of the command. The first communication partner, therefore, disconnects the first communication connection (only) following a confirmation by the second communication partner that the communication connection is really intended to be disconnected. An erroneous disconnection of the communication connection as a result of an attack by a third party (i.e., a transmission of the first message by the third party) can, thus, be avoided. The resilience of the first communication connection to third-party attacks can, thus, be improved.

According to some example embodiments, the first communication partner is further configured to maintain the first communication connection if the first communication partner receives a fourth message via the second communication connection, the fourth message containing a negation of the validity of the command. If the first message does not originate from the second communication partner, the first communication connection is, therefore, maintained. An erroneous disconnection of the communication connection as a result of an attack by a third party (i.e., a transmission of the first message by the third party) can, thus, be avoided. The resilience of the first communication connection to third-party attacks can, thus, be improved.

In some example embodiments, the second communication partner is configured to check, following reception of the second message, whether the command was transmitted by the second communication partner. The second communication partner, following a request from the first communication partner, therefore, actively checks whether the first message along with the disconnection command was actually transmitted by it. If the command was transmitted by the second communication partner, the second communication partner is configured to transmit the third message to the first communication partner via the second communication connection. If the command was transmitted by the second communication partner, the second communication partner is configured to transmit the fourth message to the first communication partner via the second communication connection. Through the active verification by the second communication partner when requested, information relating to the verification of the validity of the first message can be provided to the first communication partner. The transmission of the third or fourth message via the second communication connection can furthermore increase security against manipulations by third parties, since the third party must also be aware of the second communication connection as well as the first communication connection, and would have to manipulate or influence both communication connections more or less simultaneously.

According to some example embodiments, the first communication connection is in turn a wireless connection between the first communication partner and the second communication partner. As indicated above, the design of the first communication connection as a wireless connection can simplify a normal data exchange between the communication partners.

In some example embodiments, the second communication connection is in turn a wired connection between the first communication partner and the second communication partner. As indicated above, this can, for example, enable the use of an already existing wire connection between the two communication partners with a low data rate. A wired connection can similarly increase security against third-party attacks.

In some further example embodiments, the system or components of the system can be configured to carry out one or more of the further aforementioned method operations.

According to another disclosed embodiment, the resilience of a communication connection to third-party attacks can be improved by a vehicle. The vehicle comprises a system according to the example embodiments above. A vehicle is a mobile mode of transport for transporting persons or goods. The vehicle may be either a passenger vehicle or a goods vehicle. A vehicle may, for example, be a passenger vehicle, a truck, a motorcycle or a tractor. A vehicle can generally be regarded as a device which comprises an engine, a powertrain system and wheels.

A communication connection between two vehicle components communicating with one another is, therefore, disconnected (only) following a confirmation that the communication connection is really intended to be disconnected. An erroneous disconnection of the communication connection as a result of an attack by a third party can, thus, be avoided. The resilience of the communication connection in the vehicle to third-party attacks can, thus, be improved.

In some example embodiments, the first communication partner or the second communication partner of the system is a communication device of the vehicle for communicating with a cellular network (e.g., according to a standard of the 3rd Generation Partnership Project, 3GPP) and the other communication partner is an infotainment system of the vehicle. The infotainment system and communication device are, for example, coupled in the vehicle to perform vehicle functions (e.g., emergency call functions) or infotainment functions (e.g., rear-seat entertainment, audio or video streaming). A failure of the communication between the infotainment system and the communication device and, therefore, also of the aforementioned functionalities as a result of a third-party attack can be prevented.

According to some example embodiments, the first communication connection is a wireless local network. The connection via a wireless local network may reduce the wiring in the vehicle and therefore, along with a simplification of the installation, may also reduce vehicle manufacturing costs.

In some example embodiments, the second communication connection is a Controller Area Network (CAN) bus. Many components in the vehicle (e.g., infotainment system and communication device) are coupled to one another via a CAN bus to ensure that, for example, credentials can be exchanged between them. By using the CAN bus as the second communication connection, a communication connection already present in the vehicle can, therefore, be used. The installation of additional components for the implementation of the present disclosure can, thus, be avoided.

Figure 2:
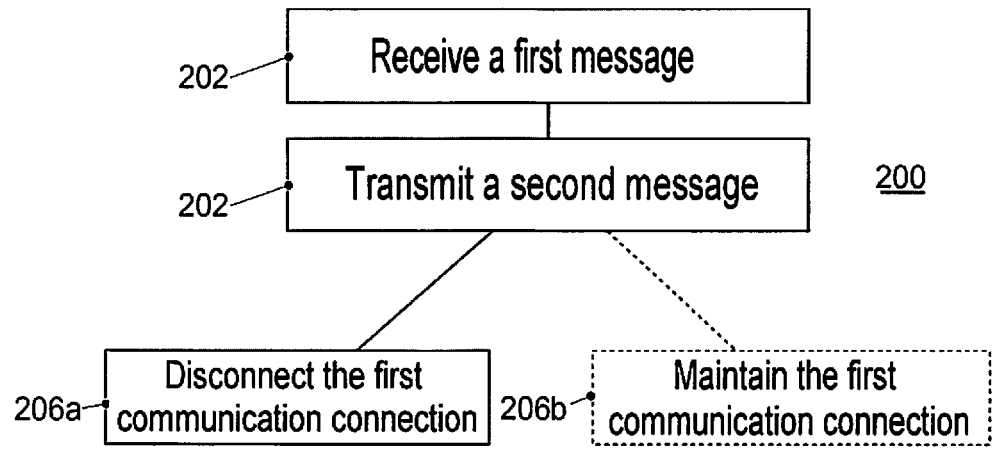
FIG. 2 shows a flow diagram of an example embodiment of a method for managing a first communication connection between a first communication partner and a second communication partner.

FIG. 2 shows a method 200 for managing a first communication connection between a first communication partner and a second communication partner.

The method 200 comprises a reception 202 of a first message by the first communication partner. The first message contains a command to disconnect the first communication connection.

The method 200 further entails a transmission 204 of a second message by the first communication partner to the second communication partner via a different second communication connection between the first communication partner and the second communication partner. The second message contains a request to confirm the validity of the command.

The method 200 furthermore comprises a disconnection 206a of the first communication connection by the first communication partner if the first communication partner receives a third message via the second communication connection, the third message containing a confirmation of the validity of the command.

Alternatively, the method 200 comprises a maintenance 206b of the first communication connection by the first communication partner if the first communication partner receives a fourth message via the second communication connection, the fourth message containing a negation of the validity of the command.

The communication connection is, therefore, disconnected (only) following a confirmation by the second communication partner that the communication connection is really intended to be disconnected. If the first message does not originate from the second communication partner, the first communication connection is, therefore, maintained. An erroneous disconnection of the communication connection as a result of an attack by a third party (i.e., a transmission of the first message by the third party) can, thus, be avoided. The resilience of the first communication connection to third-party attacks can, thus, be improved.

Further details of the method 200 are described above and below in connection with one or more example embodiments. The method 200 may comprise one or more optional features according to one or more of the other example embodiments.

Figure 3:
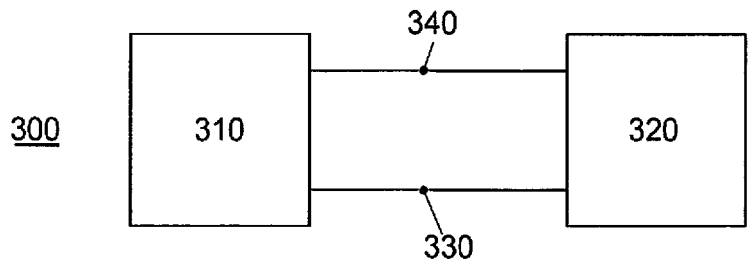
FIG. 3 shows an example embodiment of a system comprising a first communication partner and a second communication partner.

FIG. 3 further shows a system 300 comprising a first communication partner 310 and a second communication partner 320. The first communication partner 310 and the second communication partner 320 communicate with one another via a first communication connection 330.

The first communication partner 310 is configured to receive a first message, wherein the first message contains a command to disconnect the first communication connection 330. As already explained above, the first message may originate from either the second communication partner 320 wishing to disconnect the first communication connection 330 to the first communication partner 310, or from an attacker wishing to interrupt the communication connection 330 between the first communication partner 310 and the second communication partner 320.

The first communication partner 310 is furthermore configured to transmit a second message to the second communication partner 320 via a different second communication connection 340 between the first communication partner 310 and the second communication partner 320. The second message contains a request to confirm the validity of the command. The first communication partner 310 can verify by the second message whether the first message with the disconnection command actually originates from the second communication partner 320.

The first communication partner 310 is furthermore configured to disconnect the first communication connection 330 (only) if the first communication partner receives a third message via the second communication connection 340, the third message containing a confirmation of the validity of the command. The first communication partner 310, therefore, disconnects the first communication connection 330 (only) following a confirmation by the second communication partner 320 that the communication connection is really intended to be disconnected. An erroneous disconnection of the communication connection 330 as a result of an attack by a third party (i.e., a transmission of the first message by the third party) can, thus, be avoided.

The first communication partner 310 can furthermore also be configured to maintain the first communication connection 330 if the first communication partner receives a fourth message via the second communication connection 340, the fourth message containing a negation of the validity of the command. If the first message does not originate from the second communication partner 320, the first communication connection 330 is, therefore, maintained. An erroneous disconnection of the communication connection 330 as a result of an attack by a third party (i.e., a transmission of the first message by the third party) can, thus, be avoided. The resilience of the first communication connection 330 to third-party attacks can, thus, be improved.

Further details of the system 300 are described above and below in connection with one or more example embodiments. The method 300 may comprise one or more optional features according to one or more of the other example embodiments.

Figure 4:
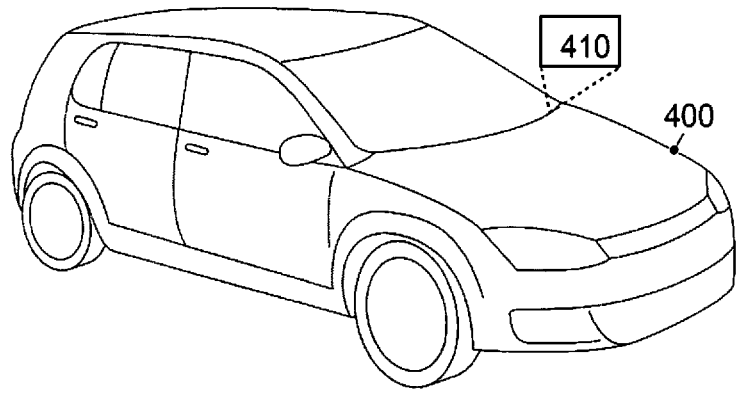
FIG. 4 shows an example embodiment of a vehicle.

FIG. 4 now shows a vehicle 400 with a system 410 according to example embodiments. A communication connection between two communication partners of the vehicle 400 communicating with one another is, therefore, disconnected (only) following a confirmation that the communication connection is really intended to be disconnected. An erroneous disconnection of the communication connection as a result of an attack by a third party can, thus, be avoided. The resilience of the communication connection in the vehicle 400 to third-party attacks can, thus, be improved.

Figure 5:
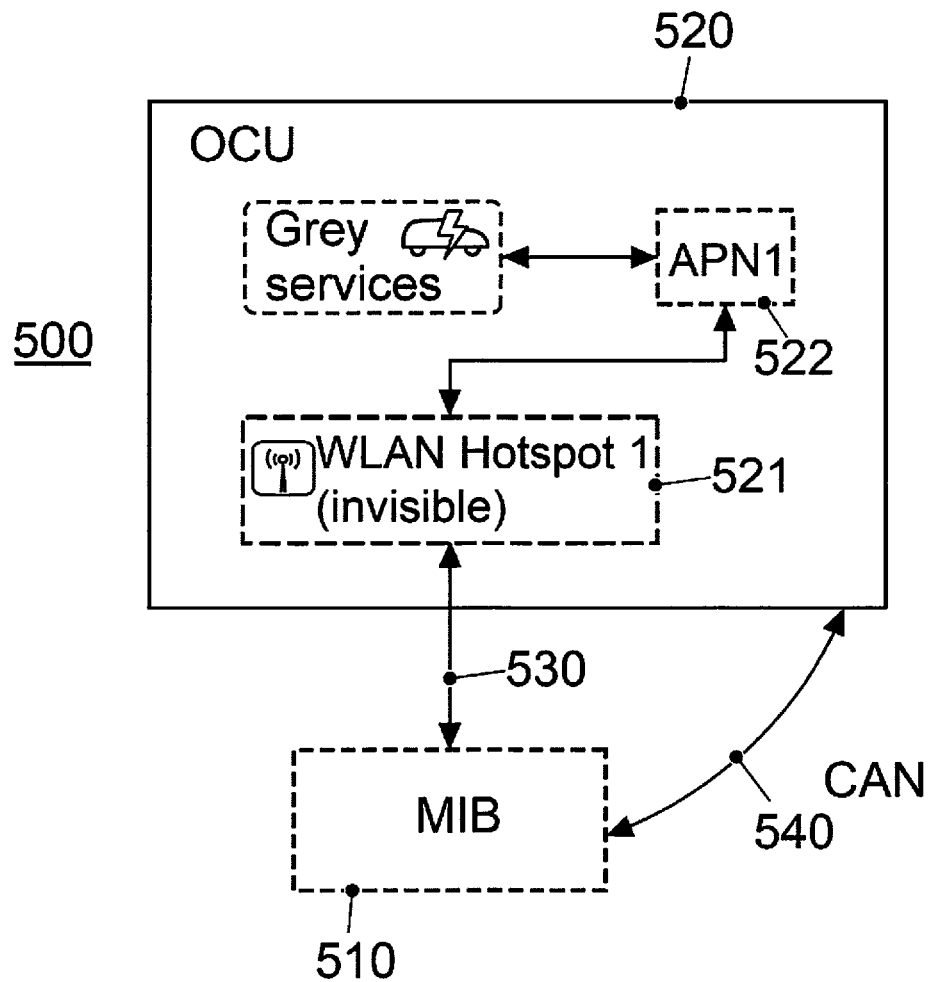
FIG. 5 shows an example embodiment of a system comprising an infotainment system and a communication device of a vehicle.

FIG. 5 further shows another example embodiment of a system 500 in which the first communication partner is an infotainment system 510 of a vehicle and the second communication partner is a communication device 520 of the vehicle for communicating with a cellular network.

In the system 500 shown in FIG. 5, a WLAN connection exists between the hotspot 521 of the communication device (communication unit, OCU) 520 and the infotainment system (MIB) 510. The cellular network can be accessed via the access point 522.

A CAN connection additionally exists between the two devices. Control parameters, for example, for automatic authentication can be exchanged via this path.

The functionality of the WLAN connection between the OCU and MIB may be essential for the performance of vehicle functions (e.g., "grey" [vehicle-specific, background-running] services such as emergency call functions) and for the provision of infotainment functions (e.g., rear-seat entertainment, audio/video data). However, this path is at risk, e.g., in the event of a deauthentication attack.

In the present system 500, the OCU 520 and the MIB 510 are interconnected by an invisible hotspot and can additionally exchange messages via a CAN bus 540. It is ensured by the CAN bus 540 that credentials can be exchanged between the two devices. There are, therefore, precisely two communication participants (i.e., communication partners). This can be used to protect against deauthentication.

If a deauthentication request is received, a query is initiated via an available second channel (in this case the CAN bus 540) to determine whether the deauthentication request was correctly made.

If the deauthentication request originates from an external attacker, the confirmation would fail and the request can be ignored.

Through the use of the CAN bus 540 as the second communication connection, the first communication connection can, thus, be protected via the WLAN connection 530 against third-party attacks. A failure of the communication between the infotainment system 510 and the communication device 520 and, therefore, also of the aforementioned functionalities as a result of a third-party attack can thereby be prevented.

The improvement in the resilience of a WLAN connection to deauthentication attacks can, thus, be enabled.

Figure 6:
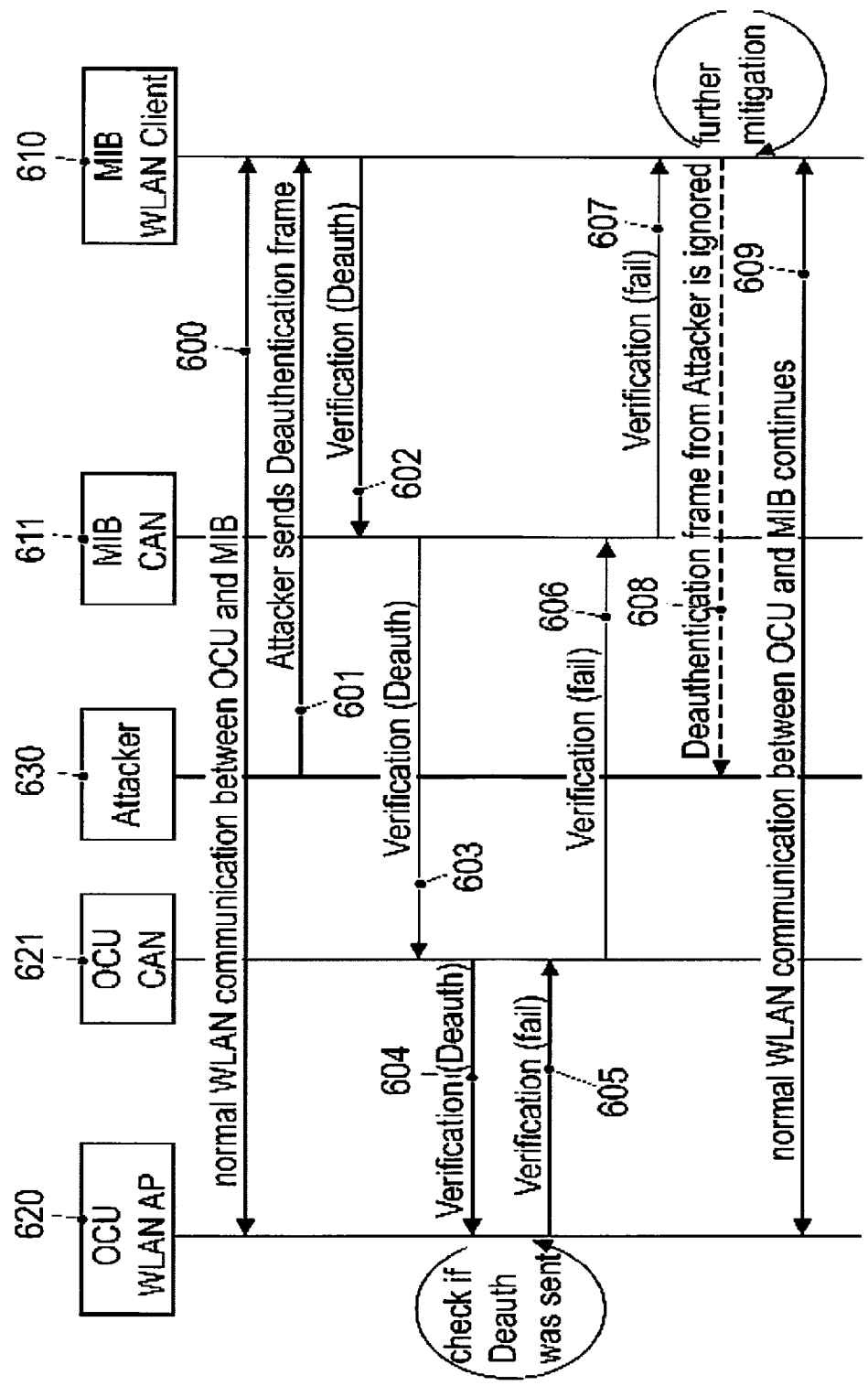
FIG. 6 shows an example embodiment of a schematic sequence of the disclosed method between an infotainment system and a communication device of a vehicle.

FIG. 6 shows a schematic sequence of a communication between an infotainment system and a communication device of a vehicle. In other words, the system may be formed from the participants indicated above. A communication scenario following the reception of a deauthentication frame is shown.

A normal WLAN communication 600 first takes place between the WLAN client 610 of the infotainment system and the WLAN access point (hotspot) 620 of the communication device. The WLAN client 610 of the infotainment system receives 601 a deauthentication frame, i.e., a command to disconnect the WLAN connection to the WLAN access point 620 of the communication device, from an attacker 630.

The WLAN client 610 of the infotainment system then transmits 602 a request to a CAN bus connection 611 of the infotainment system to confirm the validity of the deauthentication frame. The CAN bus connection 611 of the infotainment system forwards 603 the request to a CAN bus connection 621 of the communication device. The request is forwarded 604 from the CAN bus connection 621 of the communication device to the WLAN access point 620 of the communication device.

The WLAN access point then checks whether it transmitted the deauthentication frame via the WLAN connection to the WLAN client 610 of the infotainment system. If not, it transmits 605 a negation of the validity of the deauthentication frame to the CAN bus connection 621 of the communication device. The latter forwards 606 the information to the CAN bus connection 611 of the infotainment system, which in turn forwards the information to the WLAN client 610 of the infotainment system 607.

Since the validity of the deauthentication frame 601 has been negated, the frame is then ignored 608 by the WLAN client 610 of the infotainment system. A normal WLAN communication 609 between the WLAN client 610 of the infotainment system and the WLAN access point 620 of the communication device then continues to take place.

The schematic sequence shown in FIG. 6, thus, teaches the use of a second independent communication channel to confirm the validity of a WLAN deauthentication frame.

The scenario shown in FIG. 6 takes place in a similar manner when an authentication frame is received by the communication device (OCU), i.e., when a command is received to set up a communication connection.

A deauthentication (and, therefore, the dispatch of a deauthentication frame) can be carried out not only by the client, but also by the network access point. In this case, the embodiment outlined above would obviously operate in a similar manner.

Apart from the dispatch of a falsified deauthentication frame, a WLAN connection can also be interrupted, for example, by the dispatch of a disassociation frame also. Disassociation frames are dispatched if the connection between the client and the network access point is intended to be disconnected, but the authentication parameters are not intended to be reset (e.g., in the case of WLAN roaming between two network access points of a WLAN network). Disassociation frames can be dispatched by both the client and the network access point. The embodiment outlined above is obviously similarly applicable to disassociation frames.

Although the wireless connection (via WLAN) between a communication device of a vehicle and an infotainment system of the vehicle has been described above by way of example, the disclosed embodiments are obviously also possible, for example, for the use of wireless connections (for example, WLAN) between control units in the vehicle or the use of wireless connections (for example, WLAN) between the vehicle and external devices (for example, mobile terminal devices of a vehicle occupant) or the use of wireless connections (for example, WLAN) between devices not related to a vehicle.

REFERENCE NUMBER LIST

110 Client
111 Authentication request
112 Association request
113 Data
114 Data
120 Network access point
121 Authentication response
122 Association response
123 Deauthentication
130 Attacker
131 Falsified deauthentication request
200 Method for managing a first communication connection
202 Receive a first message
204 Transmit a second message
206*a* Disconnect the first communication connection
206*b* Maintain the first communication connection
300 System
310 First communication partner
320 Second communication partner
330 First communication connection
340 Second communication connection
400 Vehicle
410 System
510 Infotainment system
520 Communication device
521 Hotspot
522 Access point
530 WLAN connection
540 CAN bus
600 WLAN communication
601 Deauthentication frame
602 Receive
603 Transmit
604 Forward
605 Transmit
606 Forward
607 Forward
608 Ignore
609 WLAN communication
610 WLAN client of the infotainment system
611 CAN bus connection of the infotainment system
620 WLAN client of the communication device
621 CAN bus connection of the communication device
630 Attacker

The invention claimed is:

1. A method for managing a first communication connection between a first communication partner and a second communication partner, the method comprising:
   receiving a first message by the first communication partner, wherein the first message contains a command to disconnect the first communication connection;
   transmitting a second message by the first communication partner to the second communication partner via a different, second, communication connection between the first communication partner and the second communication partner, wherein the second message contains a request to confirm a validity of the command;
   disconnecting the first communication connection by the first communication partner in response to the first communication partner receiving a third message via the second communication connection, the third message containing a confirmation of the validity of the command.

2. The method of claim 1, further comprising maintaining the first communication connection by the first communication partner in response to the first communication partner receiving a fourth message via the second communication connection, the fourth message containing a negation of the validity of the command.

3. The method of claim 2, wherein, following the reception of the second message, the method further comprises:
checking by the second communication partner whether the command was transmitted by the second communication partner; and
in response to the command being transmitted by the second communication partner, transmitting the third message to the first communication partner via the second communication connection; or
in response to the command not being transmitted by the second communication partner, transmitting the fourth message to the first communication partner via the second communication connection.

4. The method of claim 2, further comprising logging the first message in response to the command not being transmitted by the second communication partner.

5. The method of claim 1, wherein the first communication connection is a wireless connection between the first communication partner and the second communication partner.

6. The method of claim 1, wherein the second communication connection is a wired connection between the first communication partner and the second communication partner.

7. A system for providing communication between a communication device and a vehicle infotainment system, the system comprising:
a first communication connection for communication between the communication device and the vehicle infotainment system; and
a second communication connection for communication between the communication device and the vehicle infotainment system,
wherein one of the communication device and the vehicle infotainment system:
receives a first message that contains a command to disconnect the first communication connection;
transmits a second message to the other of the communication device and the vehicle infotainment system via the second communication connection, wherein the second message contains a request to confirm the validity of the command; and
disconnects the first communication connection in response to the receipt of a third message via the second communication connection, the third message containing a confirmation of the validity of the command.

8. The system of claim 7, wherein the first communication connection is maintained in response to receipt of a fourth message via the second communication connection that contains a negation of the validity of the command.

9. The system of claim 8, wherein, one of the communication device and the vehicle infotainment system, following the reception of the second message, checks whether the command was transmitted by the other of the communication device and the infotainment system, and
in response to the command being transmitted by the other of the communication device and the infotainment system, transmits the third message to the communication device and the infotainment system via the second communication connection, and
in response to the command not being transmitted by the other of the communication device and the infotainment system, transmits the fourth message to the communication device and the infotainment system via the second communication connection.

10. The system of claim 7, wherein the first communication connection is a wireless connection.

11. The system of claim 7, wherein the second communication connection is a wired connection.

12. A vehicle with a system for providing communication between a communication device and a vehicle infotainment system, the system comprising:
a first communication connection for communication between the communication device and the vehicle infotainment system; and
a second communication connection for communication between the communication device and the vehicle infotainment system,
wherein one of the communication device and the vehicle infotainment system:
receives a first message that contains a command to disconnect the first communication connection;
transmits a second message to the other of the communication device and the vehicle infotainment system via the second communication connection, wherein the second message contains a request to confirm the validity of the command; and
disconnects the first communication connection in response to the receipt of a third message via the second communication connection, the third message containing a confirmation of the validity of the command.

13. The vehicle of claim 12, wherein the first communication connection is maintained in response to receipt of a fourth message via the second communication connection that contains a negation of the validity of the command.

14. The vehicle of claim 13, wherein, one of the communication device and the vehicle infotainment system, following the reception of the second message, checks whether the command was transmitted by the other of the communication device and the infotainment system, and
in response to the command being transmitted by the other of the communication device and the infotainment system, transmits the third message to the communication device and the infotainment system via the second communication connection, and
in response to the command not being transmitted by the other of the communication device and the infotainment system, transmits the fourth message to the communication device and the infotainment system via the second communication connection.

15. The vehicle of claim 12, wherein the communication device is a communication device of the vehicle for communicating with a cellular network.

16. The vehicle of claim 12, wherein the first communication connection is a wireless local network.

17. The vehicle of claim 12, wherein the second communication connection is a CAN bus.

* * * * *